Sept. 14, 1948.                G. L. MOELLER                 2,449,309
                    METHOD OF MANUFACTURING COMMUTATORS
                         Original Filed Aug. 4, 1943

INVENTOR.
George L. Moeller
BY Bair & Freeman
Attys

Patented Sept. 14, 1948

2,449,309

UNITED STATES PATENT OFFICE 2,449,309

METHOD OF MANUFACTURING COMMUTATORS

George L. Moeller, St. Louis, Mo., assignor, by mesne assignments, to Knapp-Monarch Company, St. Louis, Mo., a corporation of Delaware Original application August 4, 1943, Serial No. 497,349. Divided and this application June 15, 1944, Serial No. 540,527

1 Claim. (Cl. 29—155.54)

My present invention relates to a method of manfacturing a commutator structure, the present application being a divisional of my co-pending application, Serial No. 497,349, filed August 4, 1943, and which application claims the commutator structure per se. Said application issued as Patent No. 2,388,006 on October 30, 1945.

One object of the invention is to provide a method of manufacturing a commutator in which the commutator bars are formed of sheet metal stampings initially in disc form, the discs having openings therethrough, permitting the molding of insulating material through the openings and on opposite faces of a stack of the discs.

Another object of the method is to form the discs into laminated commutator bars by sawing into their edges at circumferentially spaced points and slightly into the molded core so that the commutator bars are thus electrically isolated from each other and are rigidly held by the molded core in their proper positions with relation to each other due to initially being formed, each disc in a single piece.

A further object is to provide a method of manufacturing a commutator that insures accurate alignment of the commutator segments due to their initial integral state after which the steps of molding a core for the commutator and separating the segments by machining the slots between them completes the commutator and produces one which has many inherent advantages as will hereinafter appear.

With these and other objects in view, my present invention consists in the steps of a method for forming a commutator whereby the objects contemplated are attained as hereinafter more fully set forth, pointed out in my claims and illustrated in the accompanying drawings. Although the method is susceptible of being varied to some extent, it is unnecessary to fully describe more than one method in order to give a full understanding of the invention from its functional and operational standpoints. Accordingly, I have illustrated a preferred and desired embodiment of the method and the commutator produced thereby on the accompanying drawings in which:

Figure 5:
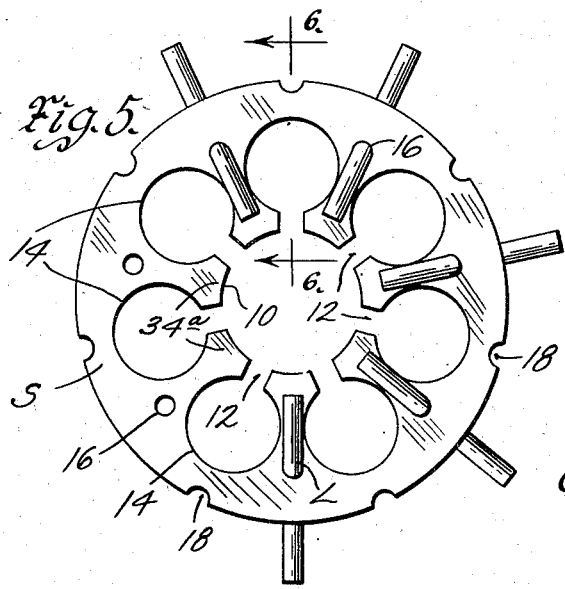
Figure 5 is a front elevation of the laminae and commutator leads assembled with the exception of two leads being omitted in order to show one of the steps in my method.
Figure 6:
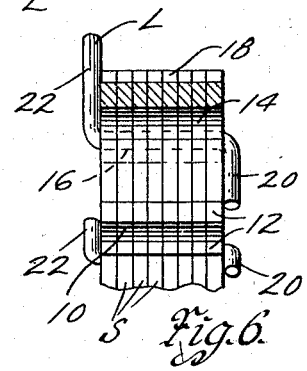
Figure 6 is a sectional view on the line 6—6 of Figure 5.

On the accompanying drawing I have used the reference character S to indicate a stack of laminae which in their initial shape as shown in Figure 5, provide a substantially washer-like element with certain modifications which will now be described. The center opening of the washer is indicated at 10 and connected with this opening by slots 12 are core receiving openings 14. Between the core receiving openings I provide commutator lead openings 16 and adjacent the outer edges of the openings 14 I provide notches 18.

These laminae may be individually stamped from sheet copper thus making them relatively inexpensive to fabricate. On the other hand, the segment element may be cast or forged of solid metal if such is more desirable than making it of a plurality of laminae.

Commutator leads L extend through the openings 16 and have inwardly and outwardly bent terminal ends indicated at 20 and 22 respectively. During the process of manufacture these leads are inserted through the stack of laminae after one of the ends is properly bent and then the other end is bent, as to the shape shown in Figure 3, following which the entire assembly of laminae and commutator leads may be dipped in molten solder for providing good electrical connection between them. As an alternative, the commutator leads may be sweated into position and the ends 20 and 22 individually soldered or brazed.

Figure 3:
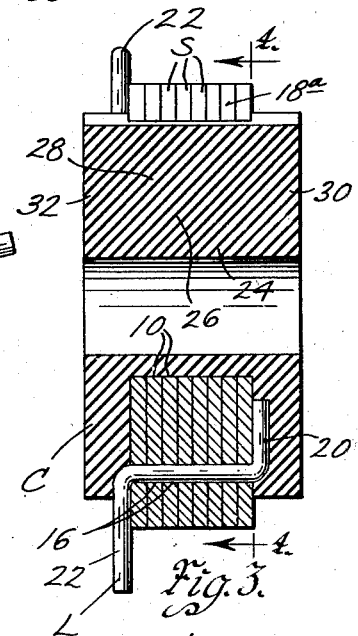
Figure 3 is an enlarged sectional view on the line 3—3 of Figure 1.

A core C is provided for the commutator and this core is molded into the assembly shown in Figure 5 after the remaining two commutator leads omitted from the left side of the figures are assembled. The molding dies are of the proper shape to cause a hub portion 24 of the core to line the central opening 10 of the stack of laminae, another portion to fill the slots 12 as shown at 26, a third portion to fill the core receiving openings 14 as shown at 28 and still other portions to provide flanges 30 and 32 on the opposite faces of the stack of laminae. As shown adjacent the notch 18 in Figure 4, the core portion 28 completely fills the opening 14. The core portions 26 and 28 as well as the core portion 24 extend all the way from the flange 30 to the flange 32 and these parts are all integral with relation to each other as shown in Figure 3 (upper half).

Figure 1:
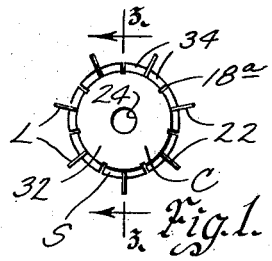
Figure 1 is a front elevation of a commutator structure embodying my invention, the commutator being shown full size, although of course its size may be either increased or decreased and yet obtain the same advantages.
Figure 2:
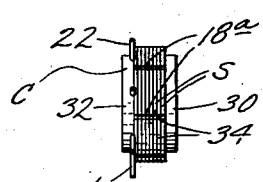
Figure 2 is a side elevation of the commutator.
Figure 4:
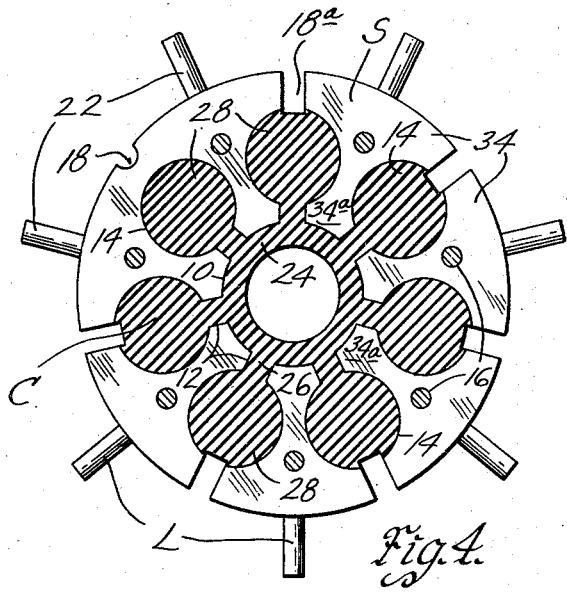
Figure 4 is a sectional view on the line 4—4 of Figure 3, with one of the slots between two of the segments uncut.

After the core C is molded, slots 18a are sawed or milled into the stack of laminae at each notch 18 as shown at the remaining six notches of Figure 4 whereby the stack of laminae S is divided into a plurality of electrically isolated segments 34. The slots 18a extend inwardly just far enough to cut through all of the metal and slightly into the core. The resulting structure is a commutator wherein the segments are securely anchored against centrifugal force due to high speed rotation of the commutator because each segment 34 has an enlarged head-like element 34a (see Fig. 4) interlocked between the two adjacent core portions 28. The core portions 28 in turn are amply supported against outward movement under the action of centrifugal force by the portions 26 connected to the hub portion 24 and by the flanges 30 and 32 connected with the ends of the portions 28 and with the ends of the portions 24 and 26 of the core.

From the foregoing specification it is obvious that I have provided a commutator structure which is inexpensive to manufacture in accordance with my method and particularly because the commutator segments may be formed of sheet metal stampings and the core molded into an interlocking relationship therewith. The steps of the method are relatively few, involving only one machining operation—that of cutting the slots 18a. This operation electrically isolates the segments from each other, whereas they were initially connected together for accuracy in their position relative to each other during the core-forming step of the process. Obviously a final finishing operation may be performed on the periphery of the completed commutator if necessary or desired.

Some variation in the steps of my method may be practiced within the scope of the appended claims without departing from the real spirit and purpose of my invention. It is therefore my intention to cover by my claim any modified or equivalent methods which may be reasonably included within their scope.

What I claim as my invention is:

A method of manufacturing a commutator comprising stacking a plurality of laminae, extending commutator leads through the stack, bending their ends across the faces of the end laminae, molding a core in and partially around said stack of laminae and around said bent ends of said leads with the exception of one end of each left for a circuit connection, and cutting the laminae at circumferentially spaced points to electrically isolate portions thereof from each other, said portions constituting the commutator segments.

GEORGE L. MOELLER.

REFERENCES CITED

The following references are of record in the file of this patent:

UNITED STATES PATENTS

| Number | Name | Date |
| --- | --- | --- |
| 1,233,764 | Dunham | July 17, 1917 |
| 1,241,559 | Schiebe | Oct. 2, 1917 |
| 1,255,681 | Zenk | Feb. 15, 1918 |
| 1,319,988 | Blumberg | Oct. 28, 1919 |
| 2,138,661 | Maxwell | Nov. 29, 1938 |
| 2,188,423 | Andrews | Jan. 30, 1940 |
| 2,348,511 | Armel | May 9, 1944 |